Nov. 7, 1967   J. J. KREWALK   3,351,408
SUNLIGHT-FILTERING OCULAR ADAPTER FOR TELESCOPES
Filed Nov. 8, 1963
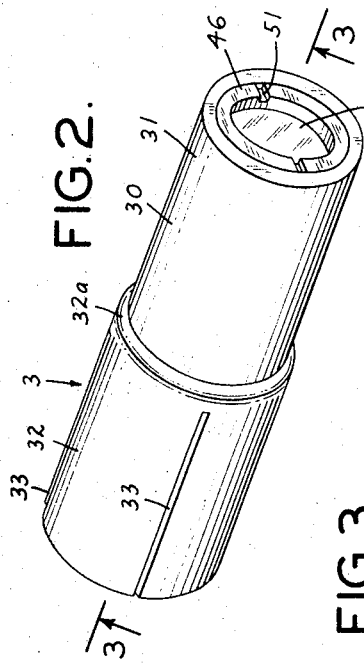
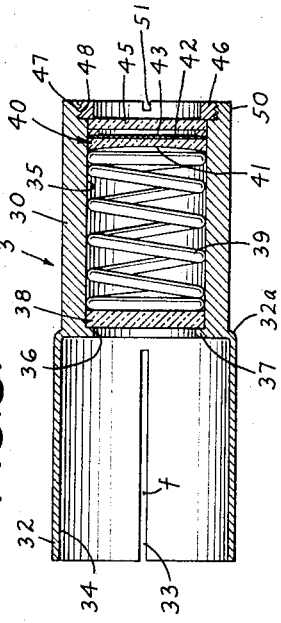
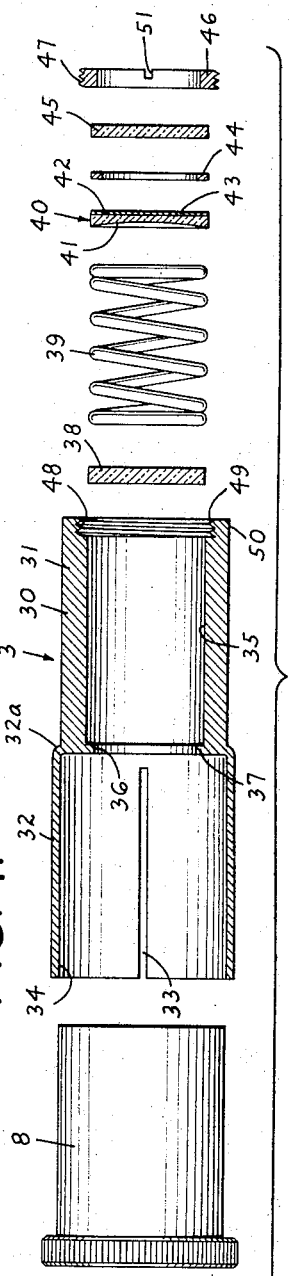
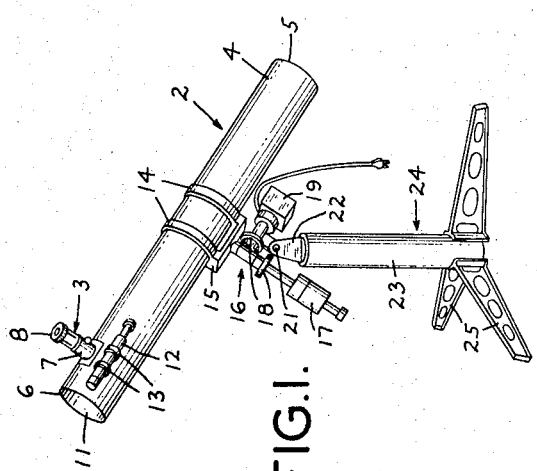
INVENTOR
JOHN J. KREWALK
BY
Andrew Kaflus
ATTORNEY

United States Patent Office 3,351,408
Patented Nov. 7, 1967

3,351,408
SUNLIGHT-FILTERING OCULAR ADAPTER
FOR TELESCOPES
John J. Krewalk, 331 Church St.,
West Hartford, Conn. 06103
Filed Nov. 8, 1963, Ser. No. 322,404
10 Claims. (Cl. 350—69)

ABSTRACT OF THE DISCLOSURE

A sunlight-filtering ocular adapter for telescopes which comprises a planar green glass filter for filtering out harmful ultra-violet and infra-red rays, in combination with a quartz lens having a concave surface thereof facing the green glass filter and a planar surface thereof coated with a thin layer of a highly reflective metal which permits transmission of from about ½% to about 3½% light through the lens whereby the sun may be safely viewed by a telescope with which the ocular adapter is used.

---

This invention relates generally to telescopic apparatus, and more particularly to ocular adapters for telescopes for permitting the direct viewing therewith of intensely luminous objects.

Users of telescopes, whether such users are of amateur status or otherwise, often find it desirable to view highly luminous bodies, and particularly the sun. Direct viewing of bodies of such intense luminosity with the naked eye is substantially impossible and even dangerous to the retina. Thus, even at the time of partial eclipse of the sun, proper viewing of this phenomenon requires at least the interposition of a heavily tinted or smoked glass plate before the eye or eyes of the observer of such phenomenon. In many instances, even glass plate treated as stated, is hardly sufficient to permit comfortable viewing of the full sun. Obviously, the inherent manifold intensification by a telescope of the luminosity of the order normally provided by the sun renders telescopic viewing of such body not only completely impossible, but extremely dangerous to the sight of the observer who may inadvertently attempt such viewing.

For the purpose of permitting the desired telescopic viewing of the sun, more or less complex and always costly optical devices, including the commercially obtainable Herschel prisms, have been devised for use with telescopes. These devices, primarily because of their initial cost and complexity of installation in existing telescopes, as well as the removal therefrom when desired, have not been employed to any great extent by the amateur. Moreover, their capabilities with respect to permitting proper resolution of the image to be viewed, has often suffered when economically desirable simplication of the adapter structure has been attempted. A separate filter is also required for this case. Improper use is extremely dangerous and amateur use can become dangerous if incorrectly done.

With the foregoing problems, and the disadvantages of the prior art attempts to solve them in view, it is a primary object of the present invention to provide an optical assembly for adapting the ocular of a telescope so that it may be used for safe and effective viewing of intensely luminous bodies, including the sun.

It is another object of the invention to provide such an adapter assembly, which may be used without alteration of the basic structure of an otherwise conventional telescope with which the adapter is to be used.

It is another object of the invention to provide an adapter of the character referred to above, which permits its facile application to and removal from the conventional ocular mounting of a telescope, as desired.

Yet another object of the invention is to provide such an adapter, which is of a comparatively simple structure, yet highly effective, in its intended function of permitting safe viewing of intensely luminous bodies without undue sacrifice of the resolution of details of the image.

Another object is to provide such an adapter structure of rugged, durable construction and yet of comparatively low cost.

Another object is to provide such an adapter which permits ready assembly and disassembly of the components thereof.

The foregoing and other objects and advantages of the present invention will become apparent from better understanding thereof by reference to the description which follows.

Generally, the ocular adapter for telescopes, in accordance with the broader aspects of the present invention, comprises a tubular housing having a major axis, a planar green glass filter for filtering out harmful ultra-violet and infrared rays, the green glass filter being mounted within the housing with the optical axis of the filter extending in the direction of the major axis of the housing, a quartz lens having a concave surface and a planar surface, the planar surface being coated with a thin layer of a highly reflective metal which permits transmission of from about ½% to about 3½% light through the lens, the lens being mounted within the housing in spaced relation to the green glass filter with the optical axis of the lens also extending in the direction of the major axis of the housing and with the concave surface facing the green glass filter.

Preferably, the tubular housing is a cylindrical casting of metal having one section thereof formed of a thickened cylindrical wall having an external diameter substantially equal to the internal diameter of the standard eye-piece support to permit a sliding fit of the wall of the housing within the support. The other section of the housing is formed of a thinner preferably deformable cylindrical wall providing in this case an internal diameter substantially equal to that of said eye-piece support and hence adapted to receive in sliding fit, a standard ocular or eye-piece. Positioned interiorly of the thickened cylindrical wall and adjacent the juncture of said wall with said thinner wall is of the planar green glass filter. Preferably, the thickened wall is provided with an internal flange or ridge adjacent said juncture to form an abutment against which the green glass filter may be positioned.

The metal-layer-coated quartz lens is preferably positioned adjacent the outer end of the thickened wall section which is remote from said inner juncture and maintained in said spaced relationship with respect to the green glass filter by resilient spacer means that are interposed therebetween and disposed so that said means do not interfere with the passing of light through the quartz lens and then through the green glass filter.

Finally, retaining means are provided at said remote outer end for maintaining the green glass filter and the coated quartz lens in the desired spaced relationship provided by the resilient spacer means.

In a preferred form, a cover glass is interposed between the coated quartz lens and the retaining means to function as protector for said coated quartz lens. To assure such effect and to obviate any optical problems that may arise when two solid light transmitting elements of differing optical characteristics are in direct abutment, an annular spacer ring is preferably positioned between the coated quartz lens and the cover glass so that there is no direct contact between said two last-named elements.

The function of the green glass filter is to filter out harmful ultra-violet and infrared rays from the portion of the light of the highly luminous body being observed, which the coated quartz lens permits to pass. Preferably, the green glass filter is of the type used in welder's goggles to filter out said harmful rays from acetylene and electric arc welding, cutting and burning and conforms with Federal specifications GGG-G-513 and GGG-H-211a. Green glass filters meeting the aforesaid requirements and hence useful in the ocular adapter of the invention, are available commercially as, for example, "Willson-Weld" glass in shades No. 6 through No. 14. To avoid complications in the optical system, the green glass filter is preferably planar and of a thickness of from about 2 mm. to about 4 mm.

The concave lens is preferably of a material having the requisite optical qualities and the characteristic that it is heat resistant to the extent that it will not crack even when transmitting the sun's rays for extended periods of time. Eminently useful for the required purposes are lenses made of quartz or fused quartz, although other optical materials having the requisite characteristics may be substituted. Normally, the range of thickness of the lens used is chosen to be between about 3 mm. and 10 mm.

The all-important reflective metallic coating on the lens is applied in a substantially uniformly thick layer only on the flat side and is preferably selected from the group consisting of aluminum, silver, chromium and gold and alloys thereof. The coating may advantageously be applied to the flat surface of the lens by the vacuum method known to the art, although other methods are usable. In any case, the thickness of the coating is chosen, in accordance with the present invention, so that the light transmission characteristic of the lens is reduced to from about ½% to about 3½% of the normal light transmission characteristic of the uncoated lens.

In the field of primary interest for use of the invention; namely, in the viewing of the sun, the total energy output of the latter including the ultra-violet and infrared light emitted thereby is best taken into consideration in the choice of metallic coating. In this connection, aluminum is more effective than either gold or chromium in the ultra-violet and visible light ranges and only slightly inferior to gold in the infrared range. Thus, at a 12-micron thickness, aluminum affords 98% reflectivity of the sun's rays while gold furnishes 98½% reflectivity. Chromium, under the same conditions, affords a somewhat lesser reflectivity of 85%. However, chromium does provide a more durable, scratch-resistant coating on the lens. Silver, on the other hand, while affording reflectivity comparable to that of chromium, is less durable and scratch-resistant and, moreover, tarnishes rapidly as would be expected.

In many instances, the telescope with which the adapter is to be used has a rather short focal distance out of the tube support for the removable oculars normally used therewith. Thus, interposition of the ocular adapter in the tube support may well cause the ocular mounted in said adapter to be positioned outside said focal distance. Thus, it is preferable that the focal length of the coated lens be chosen so that it functions to extend the aforesaid focal distance whereby it may be properly utilized by the ocular inserted into the adapter which in turn has been mounted in the tube support of the telescope. The focal length of the coated lens will thus be chosen to achieve the stated purpose as understood by those skilled in the art. As a practical matter, for employment in the usual commercially obtainable telescopes used by amateurs and the like, the coated lenses have been found particularly advantageous when provided at negative focal lengths of from about 35 mm. to about 80 mm.

When inclusion of a cover glass to protect the coated lens is deemed desirable, it is preferable that the glass also be selected to have optimum optical and heat-resistant characteristics. Hence, it is preferable that the cover glass be selected to be of the same material as the coated lens, but in this case should be substantially planar on both surfaces to obviate or at least minimize all distortion of the image being transmitted therethrough.

The invention, in its broadest aspects, is applicable to telescopes of all kinds, including the refracting or Galilean type, and the reflecting types, such as the Newtonian and Cassegrainian. Although, as just noted, the invention is applicable to telescopes of all kinds, it will be described in greater detail hereinafter in relation to the Newtonian type as exemplary of said various kinds, particularly since the Newtonian type is prevalently most in use by observers of substantially amateur status, as well as by those more seriously concerned with viewing celestial bodies or other objects.

Conventionally, Newtonian type telescopes comprise the following essential components: a tube or cylindrical body open at one end and providing the housing for the device; an objective comprising a comparatively large concave mirror that is located at the end of the housing opposite the open end thereof and facing the latter; a comparatively small plane mirror fixedly mounted within the housing in the region of the open end, at a 45 degree angle to, and in intersection with, the optical axis of the concave mirror objective; and an ocular or eye-piece optical system mounted on the body of the housing and directed at a 90 degree angle thereto, with the optical axis of the eye-piece optical system intersecting the optical axis of the objective at the inclined reflecting surface of the plane mirror. The inclined, small, plane mirror is fixed in the described relationship to the respective optical axes of the objective and ocular by means of a spider mounting within the telescope housing, which mounting provides minimum interference to light traversing the housing from the open end thereof past the plane mirror to impinge upon and to be reflected by the concave objective mirror back to the reflecting surface of the small inclined plane mirror and thence to the eye-piece optical system, where the image is viewed by the eye of the observer. Also conventionally, the telescope may be provided with a smaller telescope of the refracting type that has much less magnifying power than the main reflecting telescope and is mounted on the housing of the main telescope with its optical axis in parallel alignment with the major optical axis of the main telescope. With this arrangement, the refracting telescope is adapted for use as a sighting means for facilitating aiming the main reflecting telescope at the celestial body or other object to be viewed therewith.

It will be understood that the concept of the invention is susceptible of embodiment in many and various forms, one of which is illustrated in the accompanying drawings which form a part of this specification, and that the structural details and mode of assembly herein set forth may be varied to suit particular purposes and still remain within said inventive concept. The nature of said concept will be better understood from a consideration of the following description of said embodiment with reference to said accompanying drawings. In such drawings, wherein like reference numerals identify the same parts in the several views thereof:

FIG. 1 is a diminutive perspective view of a reflecting telescope of Newtonian design, to the ocular mounting of which an adapter of the invention has been applied;

FIG. 2 is a larger perspective view of the adapter per se of the invention shown removed from the telescope of FIG. 1;

FIG. 3 is a cross-section of the adapter shown in FIG. 2, taken along section line 3—3 of the latter figure; and FIG. 4 is an exploded view of the adapter shown in cross-section in FIG. 3, with a conventional ocular also shown associated therewith, but in elevation.

Referring now to FIG. 1 of the drawings, a reflecting telescope 2 of the Newtonian type to which the adapter 3 of the present invention may be applied to advantage, comprises a cylindrical housing 4 which conventionally has at the lower closed end 5 thereof the concave or rather parabolic reflecting mirror (not visible); and adjacent the upper open end 6, a rack and pinion ocular or eye-piece holder 7, which in this case has the adapter 3 of the invention therein, which is described in greater detail hereinafter; and mounted in the adapted 3, a conventional ocular 8. To complete the usual arrangement for this type of telescope, there is provided on the interior surface 11 of the upper end of cylindrical housing 4, a spider support (not visible), on which is mounted the usual small, inclined, plane, reflecting mirror (also not visible) in position to intercept the main optical axis of the concave reflecting mirror located in the lower closed end of telescope housing 4, and also that of the ocular 8 directed at right angles thereto.

Also included, in conventional manner, is a refracting telescope 12 that is mounted on cylindrical casing 4 by means of brackets 13 which support refracting telescope 12 with the optical axis thereof in substantially parallel relationship to the main optical axis of the concave reflecting mirror of the main telescope tube. Thus, refracting telescope 12 of lesser power may be utilized as a sighting or finding means for the main reflecting telescope tube of much higher power, as is well known in the art. Cylindrical housing 4 is mounted in a pair of rings 14 attached to a cradle support 15, which is affixed to an equatorial mount 16 comprising the usual counterweights 17, setting circles 18 for both right ascension and declination and, in this case, an electric drive 19 to permit automatic following of celestial objects for a period of time as the earth rotates. Equatorial mount 16 is rotatably supported and adjustable on a horizontal axis on bolt 21 which is carried by a bifurcated assembly 22 mounted in the hollow pedestal 23 of a tripod 24 having the legs 25. The setting circles 18 permit the setting of the telescope in accordance with star maps as is also well known in the art.

Referring now to FIGS. 2, 3 and 4, the ocular adapter 3 comprises an integral cylindrical housing 30, in this instance of aluminum and 84 mm. in length. Housing 30 is formed of a substantially rigid thicker walled section 31 of approximately 0.2 inch thickness having an external diameter of 1.25 inches dimensioned to slide within the standardly dimensioned internal diameter rack and pinion eye-piece holder 7 having an internal diameter of 1.25 inches. The remainder of the cylindrical body 30 of ocular adapter 3 comprises a slightly outwardly off-set thinner resilient wall 32. Wall 32 is provided with longitudinal slits 33 to enhance the flexibility of said wall 32, and an internal diameter 34 also of 1.25 inches whereby it is adapted to receive the exrenal diameter of the conventional ocular 8, which is otherwise normally inserted directly into eye-piece holder 7. As best seen in FIG. 4, the respective internal bores 34 and 35 of cylinder portion 32 and cylinder portion 31 communicate with each other through an aperture 36 having a bore of slightly reduced internal diameter with respect to the smaller bore 35 of cylindrical portion 31. The reduced diameter of aperture 36 is due to the presence of an internal flange or ridge 37 located substantailly medially of the ends of body 30 and provided for a purpose that will appear hereinafter.

The optical system of the adapter 3, comprises in accordance with the invention, a green filter glass 38 of planar configuration and capable of screening out harmful infrared and ultra-violet rays. In the specific embodiment being described, the green filter glass was of Willson-Weld glass, shade No. 10, having a thickness of 3.5 mm., and manufactured in accordance with Federal specifications GGG-G-513 and GGG-H-211a and having the following transmission percentage ratings: total infrared radiation, .00; ultra-violet radiation at 313 m$\mu$., .00; visible light range, 0.023 to 0.0085. The maximum permissible transmission percentages set forth in the Federal specifications referred to for the designated shade of glass used in this instance are 0.6 for total infrared radiation and 0.1 for ultra-violet radiation at 313 m$\mu$. Also in this specific instance, the calculated composition of the shade No. 10 Willison-Weld glass was as follows:

| Compound: | Percent |
|---|---|
| $SiO_2$ | 71.4 |
| $CaO$ | 1.7 |
| $Na_2O$ | 14.2 |
| $NaCl$ | .9 |
| $Na_2SO_4$ | .7 |
| $As_2O_5$ | .2 |
| $Fe_2O_3$ | 10.9 |

As shown in FIG. 3, filter glass 38 is held in abutment with flange 37 by means of a steel spring 39 having a diameter substantially equal to the internal diameter of smaller bore 35 of wall 31 and providing no substantial obstruction to the passage of light axially through bore 35 and green filter glass 38.

In abutment with the other end of spring 39 is a concave lens 40 having the concavity 41 thereof facing green filter glass 38 and the planar surface 42 thereof facing in the opposite direction. Lens 40 in this embodiment was of quartz, 3 mm. thick, and had a curvature surface 41 to provide a negative focal length of −70 mm., which in this instance, when seated in the adjustable ocular mount 7, projected the focal point of the optical system of the telescope beyond the tube of the mount and out to a point within cylindrical portion 32 of adapter 3 designated by the letter $f$ in FIG. 3.

In accordance with the present invention, the planar surface 42 of lens 40 is provided with a thin layer 43 of a reflective metal, in this case aluminum, which is deposited to a thickness whereby the light transmission of the lens is reduced to 2½% of the normal light transmission capability thereof.

In abutment with the planar surface of lens 40 which bears aluminum layer 43, there is provided, in the presently preferred embodiment, a spacing ring 44 of steel and, in abutment with the latter, a clear planar cover glass 45 also of quartz. The entire assembly of green filter glass 38, spring 39, metal layer coated lens 40, spacing ring 44, and cover glass 45, is maintained in the operative relationship shown in FIG. 3 by a retention ring 46 which is provided on its circumference with a male thread 47, receivable within a female thread 48, formed in a short re-entrant bore 49 at the distal edge 50 of the smaller cylindrical portion 31 of body 30. Retention ring 46 is of aluminum and is provided with slots 51 to permit tightening and/or loosening thereof in threads 48 as desired, by means of a suitable tool or instrument.

In the use of the adapter 3, which would normally come assembled as shown in FIG. 3 ready to use, the removable ocular 8 is first removed from its mount 7. Ocular 8 is then merely replaced in mount 7 by said adapter 3 by inserting the cylindrical portion 30 thereof with its equivalent diameter 31 fully sheathed in the barrel of said mount to the extent that off-set edge 32a of wall 32 abuts the distal edge of said mount. Thereafter, ocular 8 (or another suitable ocular) is fully seated within the barrel mounting provided by resilient wall 32 of adapter 3. The telescope 2 may then be used to view highly luminous bodies and particularly the sun, by utilization of the adjustable rack and pinion ocular mount 7 in conventional manner to obtain the desired focusing with respect to ocular 8 at which such body is safely and efficiently viewed. In this regard, the steel spacing spring 39 also functioning to conduct heat from the optical system and particularly lens 40 to the aluminum body of adapter 3 and thence to the various metal parts with which it is in contact.

While a preferred embodiment of the invention has been described above, it will be understood that various changes in said embodiment may be made within the scope of what is claimed without departing from the spirit of the invention. Merely by way of example, the materials, both of the structural assembly and of the optical system may be varied. The highly reflective coating metal for the concave lens may be other than of the preferred group of four metals and their alloys. The ocular body need not be integral. The two essential elements of the optical system, the green glass filter and the metal coated concave lens may be spaced by means other than a spring. The cover glass may be omitted in certain applications. The parts may be maintained in cooperative relationship by means other than the integral flange and removable retaining ring shown. The telescope, as mentioned hereinbefore, may be of any type suitable for visual use, including the reflector, refractor, compound, catadioptric, off-axis or other types, and the usual cameras may be attached into the eye-piece system for recording images of the bright objects including the sun. Obviously, many other changes will suggest themselves to those skilled in the art whereby the primary advantages of the invention may still be enjoyed.

I claim:

1. A sunlight-filtering ocular adapter for telescopes, said adapter comprising a tubular housing having a major axis, a planar green glass filter for filtering out harmful ultra-violet and infrared rays, said green glass filter being mounted within said housing with the optical axis of said filter extending in the direction of said major axis of said housing, a quartz lens having a concave surface and a planar surface, said planar surface being coated with a thin layer of a highly reflective metal which permits transmission of from about ½% to about 3½% light through said lens, said lens being mounted within said housing in spaced relation to said green glass filter with the optical axis of said lens also extending in the direction of said major axis of said housing and with said concave surface facing said green glass filter, said tubular housing having first means associated therewith for removably mounting said housing on a telescope so that said quartz lens is in advance of said green glass filter with respect to the normal direction of light passing through said housing, when said adapter is in use, and said tubular housing having second means associated therewith for having removably mounted thereon, an ocular, in back of said green glass filter with repect to said normal direction of light.

2. An ocular adapter as claimed in claim 1 wherein said highly reflective metal is of the group consisting of aluminum, chromium, gold and silver, and alloys thereof.

3. A sunlight-filtering ocular adapter as claimed in claim 2 wherein said first means comprises one end portion of said housing which is provided with an external diameter adapted to fit within the sleeve of the ocular support with which it is to be operatively associated, said second means comprises the other end portion of said housing which is provided with an internal diameter equal to said external diameter of said one end portion and hence adapted to receive the sleeve of an ocular otherwise receivable in the sleeve of the ocular support, and an inwardly directed annular ridge interiorly of said housing at the juncture of said one end portion with said other end portion, said green glass filter being mounted within said housing in said one end portion thereof and in abutment with said interior ridge, said lens being mounted adjacent the distal edge of said one end of said housing, spacer means separating said green glass filter from said coated quartz lens, and retaining means for maintaining said green glass filter, said spacer means, and said coated quartz lens in said relationships.

4. A sunlight-filtering ocular adapter as claimed in claim 3 wherein said spacer means comprises a metal spring and said retaining means comprises a threadedly seated ring.

5. A sunlight-filtering ocular adapter as claimed in claim 4 wherein said green glass filter, said coated quartz lens and said spring are of substantially the same diameter which is equal to the interior diameter of said one end of said housing.

6. A sunlight-filtering ocular adapter as claimed in claim 5 wherein a cover glass is positioned between said coated quartz lens and said ring.

7. A sunlight-filtering ocular adapter as claimed in claim 6 wherein a spacing ring is positioned between said coated quartz lens and said cover glass.

8. A sunlight-filtering ocular adapter as claimed in claim 7 wherein said lens has a negative focal length with the focal point thereof located within said other end portion of said housing.

9. A sunlight-filtering ocular adapter as claimed in claim 8 wherein said green glass filter is shade No. 10, said negative focal length of said lens is −70 mm., and said metal layer is of aluminum and of a thickness to reduce the light transmission of said lens to 2½% of the normal light transmission capability thereof.

10. A sunlight-filtering ocular adapter as claimed in claim 9 wherein said cylindrical housing is of aluminum, said one end portion of said htousing has a thickened rigid wall, and said other end portion of said housing has a thin resilient wall.

References Cited

UNITED STATES PATENTS

| | | | |
|---|---|---|---|
| 2,087,802 | 7/1937 | Bayer-Krucsay | 88—106 |
| 2,258,223 | 8/1941 | Sachtleben | 88—57 |
| 2,955,512 | 8/1960 | Kollmorgan | 88—32 |

OTHER REFERENCES

Advertisements on page 231, left hand column of Sky And Telescope, October 1961, vol. 22.

Robert Cox, "The Use of Barlow Lens," Gleanings For Atm's, Sky and Telescope, vol. 22 pages 362 and 363. December 1961.

DAVID H. RUBIN, *Primary Examiner.*

T. H. KUSMER, *Assistant Examiner.*